(12) United States Patent
Suanno

(10) Patent No.: US 11,667,340 B2
(45) Date of Patent: Jun. 6, 2023

(54) SCREW PROFILE MUD-PACKING PREVENTING

(71) Applicant: Caterpillar Inc., Peoria, IL (US)

(72) Inventor: Gennaro Suanno, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 615 days.

(21) Appl. No.: 16/811,990

(22) Filed: Mar. 6, 2020

(65) Prior Publication Data

US 2021/0276637 A1 Sep. 9, 2021

(51) Int. Cl.
*B62D 55/14* (2006.01)
*B62D 55/084* (2006.01)
*F16J 15/34* (2006.01)

(52) U.S. Cl.
CPC ......... *B62D 55/0845* (2013.01); *B62D 55/14* (2013.01); *F16J 15/344* (2013.01)

(58) Field of Classification Search
CPC .. B62D 55/0845; B62D 55/088; B62D 55/14; B62D 55/145; F16J 15/344
See application file for complete search history.

(56) References Cited

U.S. PATENT DOCUMENTS

| 3,871,719 | A | * | 3/1975 | Boggs | B62D 55/145 384/418 |
| 3,910,128 | A | | 10/1975 | Boggs et al. | |
| 3,913,985 | A | | 10/1975 | Orr et al. | |
| 4,371,362 | A | * | 2/1983 | Dorris | B60B 25/02 474/902 |
| 9,656,705 | B2 | | 5/2017 | Kalmes et al. | |
| 2012/0056473 | A1 | * | 3/2012 | Hashimoto | B62D 55/14 305/136 |
| 2015/0300499 | A1 | | 10/2015 | Jensen | |
| 2020/0406995 | A1 | * | 12/2020 | Plouse | F16J 15/344 |

FOREIGN PATENT DOCUMENTS

| CN | 2464686 Y | | 12/2001 |
| JP | H0721488 U | * | 4/1995 |
| JP | 2010052596 A | * | 3/2010 |
| JP | 5102147 | | 12/2012 |
| JP | 5132441 B2 | | 1/2013 |
| WO | 2008113264 | | 9/2008 |

* cited by examiner

*Primary Examiner* — Scott A Browne

(57) ABSTRACT

A rotating assembly for a machine is disclosed herein. The rotating assembly includes an annular support structure and a shaft assembly. The annular support structure includes a bore therethrough and protrusion extending helically around a portion of the bore. The shaft assembly includes a shaft and a collar coupled to the shaft. The collar includes a plurality of grooves located at the outer surface of the collar. The collar is positioned within the bore of the annular support structure such that the plurality of grooves are adjacent to the protrusion. As the annular support structure rotates, the protrusion rotates and is configured to move debris and mud out of the rotating assembly.

15 Claims, 4 Drawing Sheets

SCREW PROFILE MUD-PACKING PREVENTING

TECHNICAL FIELD

The present disclosure generally pertains to machines. More particularly this disclosure is directed toward a rotating assembly for a machine.

BACKGROUND

Some mobile machines have undercarriages with track assemblies that move along the ground as the machine travels. For example, many earthmoving machines like tractors and excavators may have such track assemblies. These track assemblies typically include an endless track that extends around various components that guide the endless track. In many track assemblies, rotating assemblies guide the endless tracks.

U.S. Pat. No. 3,913,985 to Orr et. al. describes a seal protection guard for shielding an annular seal assembly disposed between two relatively rotary members. The two rotary members include an annular barrier having a plurality of shielded openings so that tightly constrained packing of extraneous material around the seal assembly is minimized by permitting such material to be squeezed radially outwardly through the openings rather than against and into the seal assembly.

The present disclosure is directed toward improvements in the art.

SUMMARY

A rotating assembly for a machine is disclosed herein. The rotating assembly includes an annular rotating structure, an annular static structure, a seal assembly, and a helical profile. The annular static structure is positioned adjacent to the annular rotating structure. The annular rotating structure and the annular static structure form a seal cavity. The seal assembly is positioned within the seal cavity. The helical profile is located proximate to the seal assembly and extends around at least one of the annular rotating structure and the annular static structure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
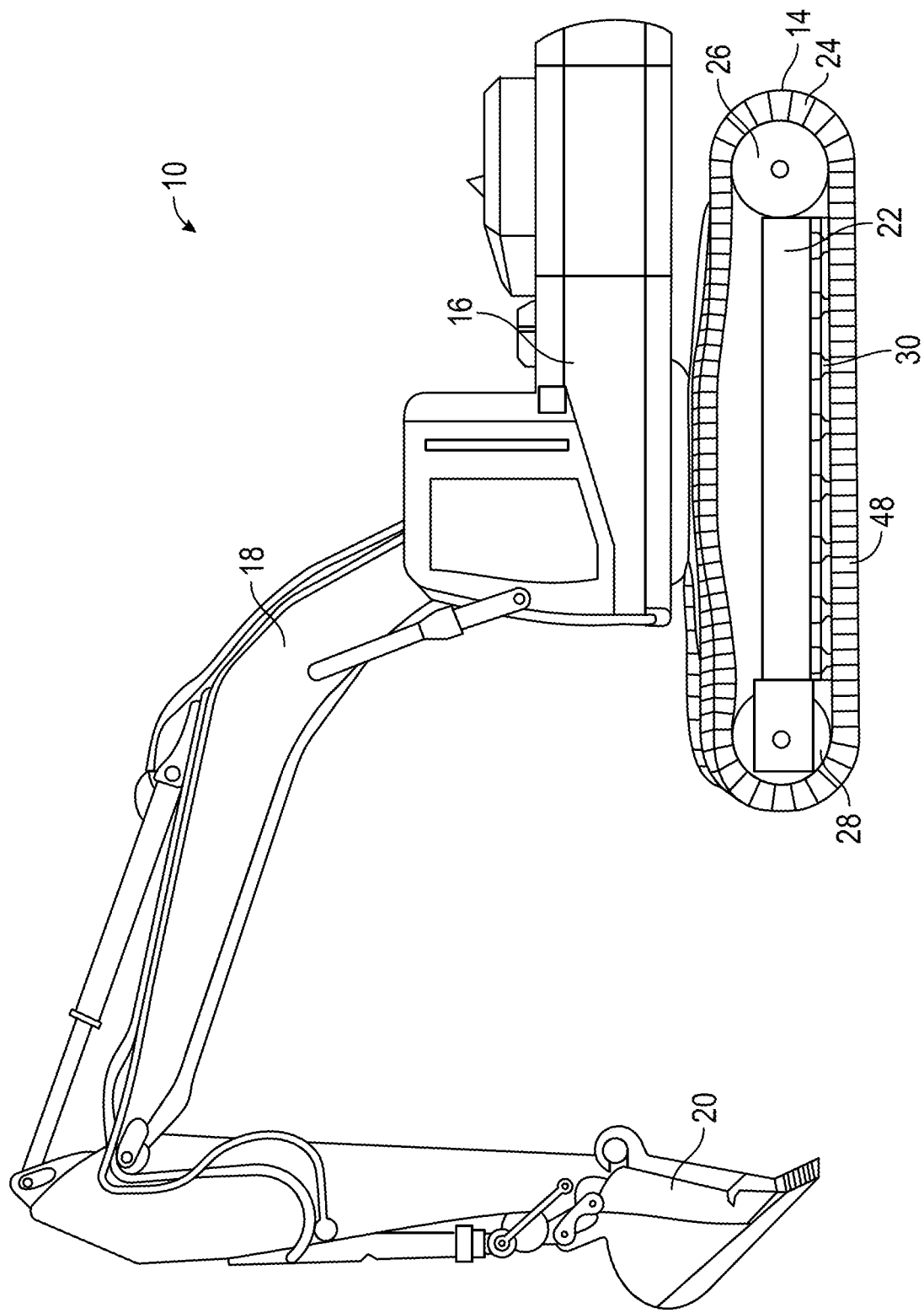
FIG. 1 is an illustration of a an exemplary track vehicle with a rotating assembly.

FIG. 1 is an illustration of a track vehicle with a rotating assembly. Where the drawing includes multiple instances of the same feature, for example rollers 30, the reference number is only shown in connection with one instance of the feature to improve the clarity and readability of the drawing. This is also true in other drawings which include multiple instances of the same feature.

A machine 10 (sometimes referred to as a track vehicle or track machine) can include a track assembly 14 that may use a rotating assembly 100 (sometimes referred to as an idler assembly or a roller assembly) according to the present disclosure. Machine 10 may include a pair of track assemblies 14, only one of which is shown in FIG. 1. Machine 10 may be any type of machine that includes an undercarriage with one or more track assemblies 14. In the embodiment shown, machine 10 is an excavator having a superstructure 16 pivotally supported from the undercarriage. In this embodiment, machine 10 may include an implement 18, which may have an excavating bucket 20 attached to it for digging. Machine 10 may alternatively be another type of machine, including, but not limited to, a track-type tractor. In examples, the track can be oval and have one idler assembly per track or include a high drive with two idler assemblies per track.

Each track assembly 14 may be configured to support machine 10 from and move along the ground, roads, and/or other types of terrain. Each track assembly 14 may include a track roller frame 22, various guide components engaged to track roller frame 22, a drive sprocket 26, an idler 28, rollers 30, and an endless track 24 extending around drive sprocket 26, the idler 28, and rollers 30.

Figure 2:
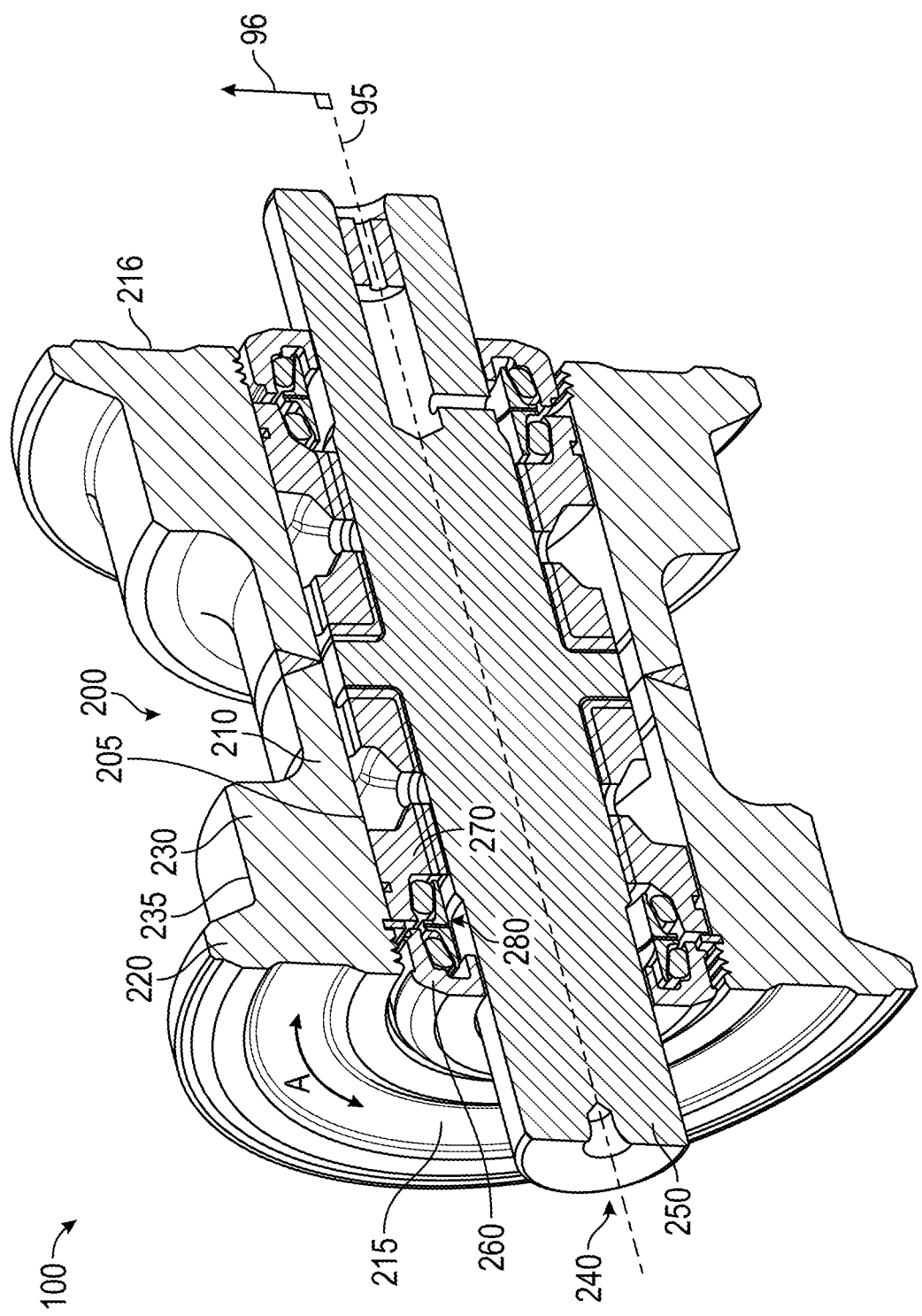
FIG. 2 is a perspective cross-section view of a rotating assembly from FIG. 1.

FIG. 2 is a perspective view of an embodiment of a rotating assembly from FIG. 1. A rotating assembly 100 can include an annular support structure 200 and a shaft assembly 240 extending through the annular support structure 200. In embodiments the annular support structure 200 can be the idler 28 and/or the roller 30 or an annular rotating structure. In other examples the annular support structure 200 can be an annular static structure. The shaft assembly 240 can be configured to couple to the track roller frame 22 in a manner such that the annular support structure 200 may rotate about an axis of rotation 95 (sometimes referred to as the longitudinal axis). The axis of rotation 95 may be generally defined by the longitudinal axis of the rotating assembly 100. The axis of rotation 95 may be common to or shared with various other concentric components of the rotating assembly 100. All references to radial, axial, and circumferential directions and measures refer to axis of rotation 95, unless specified otherwise, and terms such as "inner" and "outer" generally indicate a lesser or greater radial distance from the axis of rotation 95, wherein a radial 96 may be in any direction perpendicular and radiating outward from axis of rotation 95.

The annular support structure 200 can have a hub 210 with a bore 205 extending therethrough, a radial guide flange 220, and a track engaging rim 230. The annular support structure 200 may be constructed of various materials, such as metal. For example, the annular support structure 200 may be constructed of a ferrous metal, such as steel or iron.

The annular support structure 200 may include an idler rim, a roller, a final drive, or other similar rim structures exposed to mud packing.

The hub 210 can be a hollow cylinder portion that forms/defines the bore 205. The hub 210 can be annularly shaped and have the bore 205 sized radially larger than the shaft assembly 240. The hub 210 can extend circumferentially around the axis of rotation 95.

The radial guide flange 220 can be located radially outward of the hub 210. In an embodiment, the annular support structure 200 includes a pair of radial guide flanges 220 located at the axial ends and radial outward end of the annular support structure 200, with respect to the axis of rotation 95. In other examples, the radial guide flange 220 can have its bases at various places on the track engaging rim 230. The radial guide flange 220 can be used to align the track 24. The radial guide flange 220 can be shaped as an annulus. The radial guide flange 220 can be concentric with the track engaging rim 230.

The track engaging rim 230 can extend radially outward from and circumferentially around the hub 210. The track engaging rim 230 can extend from the hub 210 to the radial guide flange 220. The track engaging rim 230 can be configured to engage with the track 24. The track engaging rim 230 can be concentric with the hub 210.

The annular support structure 200 can have an engaging surface 235 located radially opposite of the bore 205. The engaging surface 235 can be the radially outwardly oriented surface of the track engaging rim 230 and the radial guide flanges 220.

The annular support structure 200 can have a front radial surface 215 extending from the bore 205 to proximate the engaging surface 235. The annular support structure 200 can have back radial surface 216 axially opposite from the front radial surface 215, with respect to the axis of rotation 95. The back radial surface 216 can extend from the bore 205 to proximate the engaging surface 235.

The annular support structure 200 can include a bushing 270. In an embodiment the bushing 270 is pressed into the bore 205 of the support structure 200.

The shaft assembly 240 can include a shaft 250, a collar 260, and a seal assembly 280. The shaft 250 can be centered on and extend longitudinally on the axis of rotation 95. The shaft 250 can be coupled to the track roller frame 22 and maintain a stationary position.

In an embodiment the collar 260 is an annular static structure. In other examples, the collar 260 can be an annular rotating structure.

The collar 260 can extend circumferentially around the shaft 250 as an annulus. The collar 260 can be coupled to the shaft 250 and can maintain a stationary position with the shaft 250. The collar 260 can be positioned within the bore 205 of the annular support structure 200 and can be radially adjacent with the hub 210.

The bushing 270 can be concentric with the shaft 250 and can be coupled to the hub 210. The bushing 270 can be positioned within the bore 205 and can rotate with the annular support structure 200. The bushing 270 can be positioned axially adjacent to the collar 260 with respect to the axis of rotation 95.

The seal assembly 280 can be positioned between the collar 260, the bushing 270, and the shaft 250. The seal assembly 280 can be concentric with the shaft 250. The seal assembly 180 can be positioned proximate to the helical profile 211, 212.

Figure 3:
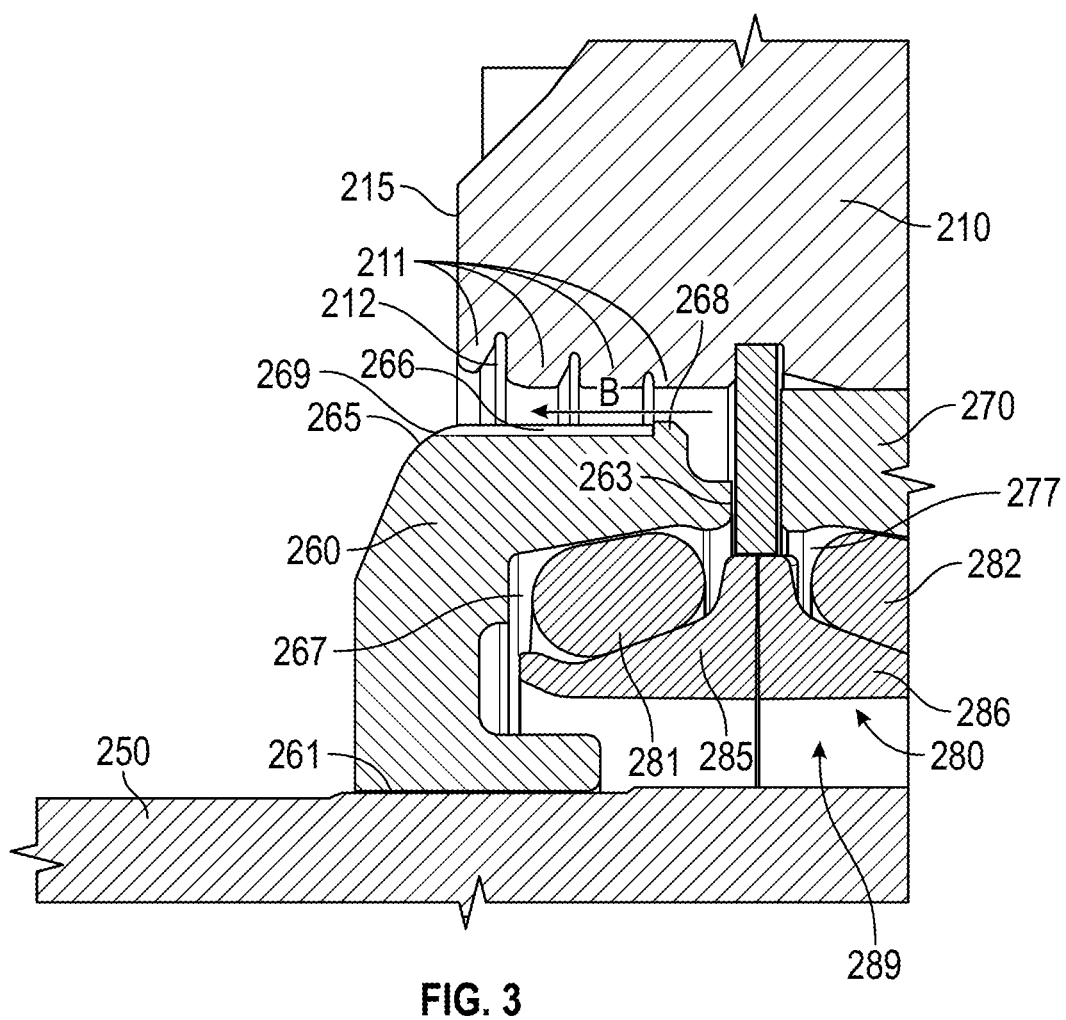
FIG. 3 is an enlarged portion of the cross-section view of the rotating assembly from FIG. 2.

FIG. 3 is an enlarged portion of the cross-section view of the rotating assembly from FIG. 2. The rotating assembly 100 can be symmetrical such that the components and features described near the from radial surface 215 exist in symmetrical position and orientation near the back radial surface 216. The hub 210 can be cylindrical with conical flared ends proximate to the front radial surface 215 and the back radial surface 216 (shown in FIG. 2). The hub 210 can have a helical profile located adjacent to the bore 205. In an embodiment the helical profile can be a protrusion 211. In an embodiment the helical profile can be a helically shaped channel 212. The annular protrusion 211 (also referred to as protrusion) can extend radially inward from the huh 210. The protrusion 211 can extend helically within the hub 210 from adjacent to the front radial surface 215 towards the back radial surface 216.

In other examples, the collar can have a helical profile located along a collar radial outer surface 265 and adjacent the bore 205. In an example the helical profile of the collar 260 can be a protrusion similar to the protrusion 211 and can extend helically around the collar 260 along the collar's outer surface 265. In another example the helical profile of the collar 260 can be a channel similar to the helically shaped channel 212 and can extend helically around the collar 260 along the collar's outer surface 265. In another example the hub 210 and the collar 260 both have helical profiles.

The protrusion 211 can form a helically shaped channel 212 as the protrusion 211 extending along the hub 210. The helically shaped channel 212 can be radially larger the closer the channel 212 is to the front radial surface 215. In an embodiment the protrusion 211 spirally extends along the hub 210 and the protrusion can be radially larger the closer the protrusion is to the front radial surface 215. In an embodiment the protrusion 211 is thinner in the axial direction the closer the protrusion is to the front radial surface 215.

In an embodiment the protrusion helically extends along the hub for at least two revolutions. In examples, the protrusion 211 helically extends along the hub for one, two, three, four, five, six, seven, eight, nine, or more revolutions. In an embodiment the axial spacing of the protrusion revolutions with respect to the axis of rotation 95 can be substantially equal. In other examples, the spacing of the protrusion revolutions varies.

The collar 260 can include a collar bore 261 and a collar radial outer surface 265 (sometimes referred to as a static structure radial outer surface) radially opposite the collar bore 261. The collar bore 261 can be sized to mate with the shaft 250. The collar radial outer surface 265 can be radially opposite from the shaft 250. The collar radial outer surface 265 can be adjacent to the protrusion 211 of the annular support structure 200 and form a gap with the protrusion 211.

The collar can include a collar outer annulus portion 268 located proximate to the collar radial outer surface 265. The collar outer annulus portion 268 can be adjacent to the protrusion 211 and can be positioned proximate to the bushing 270.

The collar 260 can include a plurality of collar grooves 266 (only one is visible in this view) located at the collar radial outer surface 265. The collar grooves 266 can extend longitudinally with respect to the shaft 250 and the bore 205 of the annular support structure 200. The collar grooves 266 can be oriented substantially opposite to the protrusion of the annular support structure 200. The collar grooves 266 can have one end that abuts the collar outer annulus portion 268 and extend through the collar radial outer surface 265. In other words, the collar grooves 266 can extend from adjacent the collar outer annulus portion 268 and have an open front and 269 opposite from the collar outer annulus portion 268.

The collar 260 can form a collar cavity 267 located inward of the collar radial outer surface 265. The bushing 270 can form a bushing cavity 277. The collar cavity 267 and the bushing cavity 277 can be adjacent to one another and form a seal cavity 289 for the seal assembly 280. The seal assembly 280 can be positioned within the seal cavity 289. The seal assembly 280 can include a first toric ring 281, a second toric ring 282, a first seal block 285, and a second seal block 286. The first tone ring 281 can be concentric with the first seal block 285 and extend around the shaft 250. The first tonic ring 281 and the first seal block 285 can be positioned within the collar cavity 267. The second tonic ring 282 can be concentric with the second seal block 286 and extend around the shaft 250. The second tonic ring 282 and the second seal block 286 can be positioned within the bushing cavity 277. The first seal block 285 can axially align with the second seal block 286. The first seal block 285 can abut the second seal block 286. In an embodiment the seal assembly 280 is a duo cone seal assembly. The first toric ring 281 and the first seal block. 285 can remain stationary with the collar 260 during operation of the machine 10 and rotation of the annular support structure 200. The second toric ring 282 and the second seal block 286 can rotate with the bushing 270 during operation of the machine 10 and rotation of the annular support structure 200.

Figure 4:
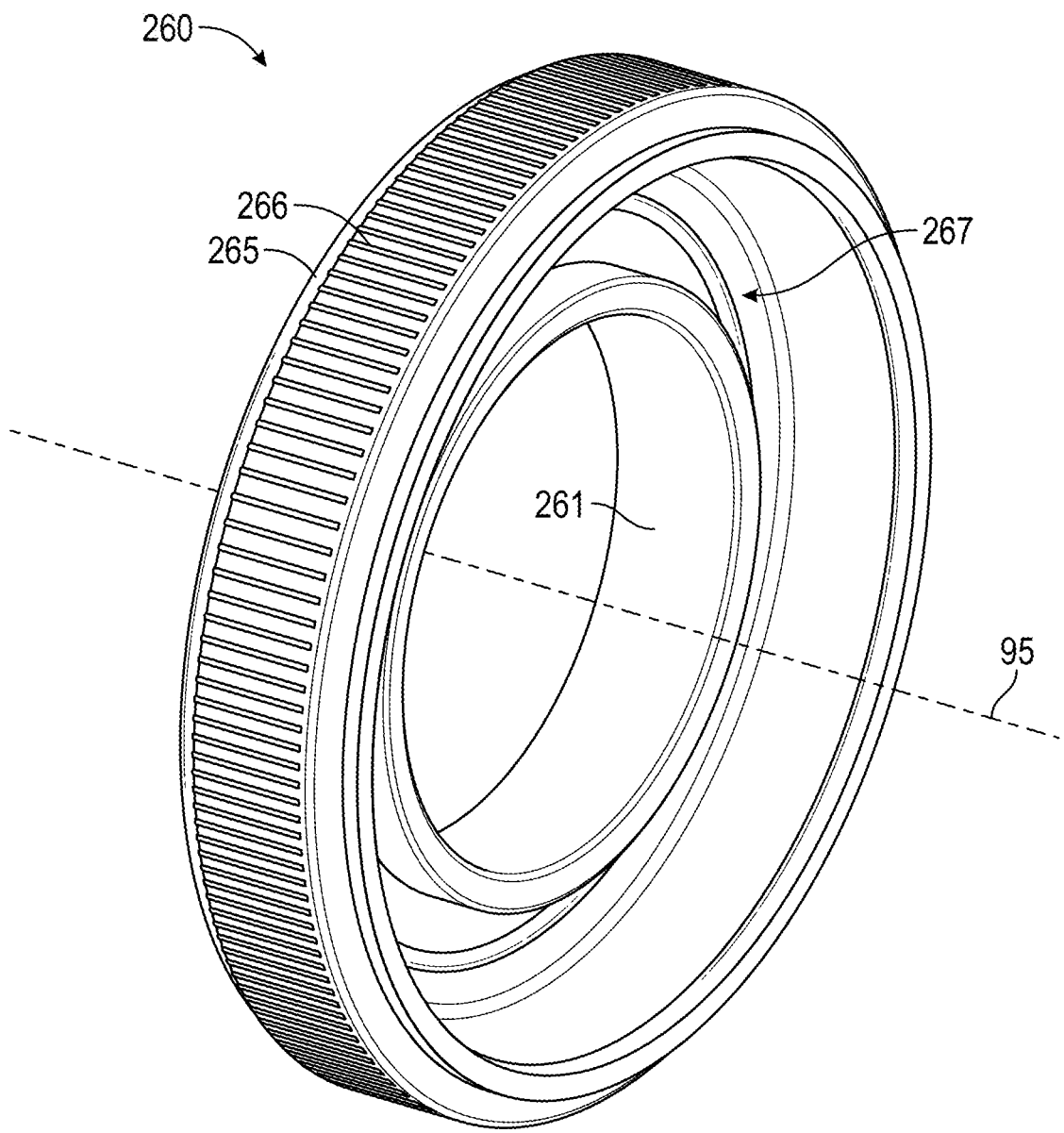
FIG. 4 is a perspective view of the collar from FIG. 2.

FIG. 4 is a perspective view of the collar from FIG. 2. The collar 260 can include a plurality of collar grooves 266. The plurality of grooves 266 can be circumferentially spaced around the collar radial outer surface 265. The plurality of grooves 266 can be linear. In other examples the plurality of groove 266 can have curvature or be angled. The plurality of grooves 266 can linearly extend substantially parallel to the axis of rotation 95. In an embodiment the plurality of grooves 266 can be equally circumferentially spaced with respect to adjacent grooves 266.

INDUSTRIAL APPLICABILITY

The present disclosure generally applies to a rotating assembly 100 for a machine 10. It is understood that the rotating assembly 100 may be used with any stationary or mobile machine known in the art. Such machines may be used in construction, farming, mining, power generation, and/or other like applications. Accordingly, such machines may include, for example, excavators, track-type tractors, wheel loaders, on-road vehicles, off-road vehicles, generator sets, motor graders, or other like machines.

The disclosed configurations of the rotating assembly 100 may provide a number of advantages. For example, the disclosed rotating assembly 100 may mitigate mud-packing proximate to the seal assembly 280. Mud-packing can be generated near the seal assembly and can displace one or more of the toric rings and/or seal bodies and promote leaks between the seal assembly components.

During operation of a machine 10, the annular support structure 200, the bushing 270, the second toric ring 282, and the second seal block can rotate (as shown by arrow A on FIG. 2) about the axis of rotation 95. The shaft 250, collar 260, first toric ring 281, and first seal block 285, can remain stationary during operation of the machine 10. The annular support structure 200 can include a protrusion 211. Protrusion 211 can have a helical profile, which when rotated with the annular support structure 200, can effectively push mud and debris away from the seal assembly 280 (as shown by arrow B on FIG. 3) and mitigate mud-packing. The collar 260 can have a plurality of grooves 266 substantially perpendicular to the protrusion 211 that can provide traction for the mud as the mud is pushed out by the rotating protrusion 211. In an example the grooves 266 can prevent mud and debris from sliding circumferentially around the collar outer surface 265. In examples the collar 260 can have other features for providing traction to debris and mud. In other examples the collar 260 can be smooth.

Although this disclosure has been shown and described with respect to detailed embodiments thereof, it will be understood by those skilled in the art that various changes in form and detail thereof may be made without departing from the spirit and scope of the claimed disclosure. Accordingly, the preceding detailed description is merely exemplary in nature and is not intended to limit the disclosure of the application and uses of the disclosure.

What is claimed is:

1. A rotating assembly for a machine, the rotating assembly having a longitudinal axis and comprising:
    an annular rotating structure having an inner surface extending in the longitudinal direction;
    an annular static structure positioned adjacent to the annular rotating structure and having a radial outer surface extending in the longitudinal direction opposite the inner surface, the annular rotating structure and the annular static structure forming a seal cavity;
    a seal assembly positioned within the seal cavity; and
    a continuous annular protrusion through a revolution about the longitudinal axis, located proximate to the seal assembly and extending helically around at least one of the annular rotating structure and the annular static structure on at least one of the radial outer surface and the inner surface.

2. The rotating assembly of claim 1, wherein the continuous annular protrusion extends from the annular rotating structure.

3. The rotating assembly of claim 2, wherein the annular static structure further includes:
    a plurality of grooves located at the static structure radial outer surface, the plurality of grooves spaced around the static structure radial outer surface, the plurality of grooves oriented substantially opposite to the annular protrusion of the annular rotating structure.

4. The rotating assembly of claim 2, wherein the annular protrusion helically extends along the annular rotating structure for at least two revolutions.

5. The rotating assembly of claim 4, wherein at least two revolutions of the annular protrusion are axially spaced substantially equally with respect to the longitudinal axis of the rotating assembly.

6. The rotating assembly of claim 1, further comprises a shaft extending along the longitudinal axis of the rotating assembly and wherein the annular rotating structure is configured to rotate about the shaft.

7. The rotating assembly of claim 1, wherein the seal assembly further includes a toric ring and a seal block positioned within the seal cavity.

8. The rotating assembly of claim 3, wherein the plurality of grooves of the annular static structure linearly extend in the longitudinal direction with respect to the longitudinal axis of the rotating assembly.

9. An annular support structure for a machine with a shaft assembly including a shaft and a collar coupled around the shaft, the annular support structure comprising:
    a hub;

a bore extending therethrough, the bore sized radially larger than the shaft assembly;

an engaging surface located radially opposite from the bore;

a front radial surface extending from the bore to the engaging surface;

a back radial surface opposite from the front radial surface, the back radial surface extending from the bore to the engaging surface; and a continuous annular protrusion through a revolution about a longitudinal axis of the hub, extending radially inward from the hub and helically around the hub, the protrusion extending from adjacent the front radial surface.

10. The annular support structure of claim 9, wherein the annular protrusion circumferentially extends along the hub for at least two revolutions.

11. The annular support structure of claim 10, wherein at least two revolutions of the annular protrusion are axially spaced substantially equally with respect to the longitudinal axis.

12. The annular support structure of claim 9, wherein the annular protrusion extends spirally around the hub.

13. A collar for a machine having a shaft and an annular support structure concentric with the shaft, the annular support structure including a hub, a bore extending therethrough, and a protrusion extending radially inward from the hub, the collar shaped annularly, the collar comprising:

a collar radial outer surface sized radially smaller than the annular support structure;

a collar outer annulus portion adjacent to the collar radial surface;

a plurality of grooves located at the collar radial outer surface, the plurality of grooves extending from the collar outer annulus portion and having an open front opposite the collar outer annulus portion, the plurality of grooves spaced around the collar radial outer surface, the plurality of grooves oriented substantially perpendicular to the radial direction of the collar; and a collar bore located opposite the collar radial surface and sized to mate with the shaft.

14. The collar of claim 13, wherein the collar extends around and is centered on a longitudinal axis, and wherein the plurality of grooves of the collar linearly extend substantially parallel to the longitudinal axis.

15. The collar of claim 13, wherein the plurality of grooves are equally circumferentially spaced between adjacent grooves.

\* \* \* \* \*